US005585996A

United States Patent [19]

Ozawa et al.

[11] Patent Number: 5,585,996

[45] Date of Patent: Dec. 17, 1996

[54] ARRESTOR FOR GAS INSULATED SWITCHGEAR

[75] Inventors: Jun Ozawa, Hitachi; Kazuya Ooishi, Toukai-mura; Katsuji Shindo, Hitachi; Yoshitaka Yagihashi, Hitachi; Shingo Shirakawa, Hitachi; Satoshi Watahiki, Hitachi, all of Japan

[73] Assignee: Hitachi, Ltd., Tokyo, Japan

[21] Appl. No.: 490,014

[22] Filed: Jun. 13, 1995

[30] Foreign Application Priority Data

Jun. 30, 1994 [JP] Japan .................................... 6-148970

[51] Int. Cl.$^6$ ........................................ H02H 9/04

[52] U.S. Cl. ........................................ 361/127; 361/56

[58] Field of Search ........................................ 361/56, 91, 127

[56] References Cited

U.S. PATENT DOCUMENTS 3,706,009 12/1972 Reitz .................................... 361/127
4,276,578 6/1981 Levinson et al. .................................... 361/127
4,547,831 10/1985 Hellman et al. .................................... 361/127
4,814,936 3/1989 Ozawa et al. .................................... 361/127

*Primary Examiner*—Todd DeBoer
*Attorney, Agent, or Firm*—Fay, Sharpe, Beall, Fagan, Minnich & McKee

[57] ABSTRACT

In order to provide an arrestor for a gas insulated switchgear in which the voltage share rates of respective zinc oxide non-linear resistance elements are made uniform, in an arrestor constituted by a plurality of columns for a gas insulated switchgear, the thickness or the capacitance of insulator spacers contacting the high voltage terminal or the ground terminal in respective columns is controlled, whereby the potentials of the zinc oxide non-linear resistance elements close to the high voltage terminal or to the ground terminal in the respective columns are shifted close to the potentials of the high voltage terminal or the ground terminal.

12 Claims, 7 Drawing Sheets

$$V=\sum_{i=1}^{7} V_i$$

$$\nabla = \sum_{i=1}^{7} \nabla_i$$

ARRESTOR FOR GAS INSULATED SWITCHGEAR

BACKGROUND OF THE INVENTION

The present invention relates to an arrestor for a gas insulated switchgear.

An example of conventional arrestors for gas insulated switchgears is shown in FIG. 2 of U.S. Pat. No. 4,814,936. As shown in FIG. 7 of the present specification the main body of the conventional arrestor is constituted by a plurality of electrically serially connected zinc oxide non-linear resistance elements 1, the main body is divided into a plurality of columns, for example, four columns A, B, C and D in order to reduce the height of the main body, each of the columns is constituted by alternately-arranged zinc oxide non-linear resistance elements 1 and insulator spacers 2 as shown, and a plurality of predetermined zinc oxide non-linear resistance elements are connected via connecting conductors 3.

With the above explained conventional arrestor, the voltage share rate characteristic on individual zinc oxide non-linear resistance elements under the operating voltage application is shown by a solid line in FIG. 8 which indicates that the voltage share rate of the zinc oxide non-linear resistance elements at the high voltage terminal H and the ground terminal E is increased so that the voltage sharing by the respective zinc oxide non-linear resistance elements is not made uniform as expected.

SUMMARY OF THE INVENTION

The present invention is achieved in view of the above conventional problem, and an object of the present invention is to provide an arrestor for a gas insulated switchgear constituted by a plurality of columns which permits the voltage share rate of the respective zinc oxide non-linear resistance elements to be made uniform.

The above object can be achieved by controlling either the thickness or capacitance of the insulator spacers which contact with the high voltage terminal and the ground terminal.

Namely, an arrestor for a gas insulated switchgear according to the present invention, in which a plurality of zinc oxide non-linear resistance elements are accommodated in a closed vessel filled with $SF_6$ gas, and in which the plurality of zinc oxide non-linear resistance elements are electrically connected in series and divided into a plurality of columns arranged in parallel, is characterized in that the thickness of insulator spacers contacting the high voltage terminal of the arrestor and of insulator spacers contacting the ground terminal of the arrestor are varied for every column constituted by a plurality of zinc oxide resistance elements, in a stepped manner depending on the number of the zinc oxide non-linear resistance elements from the respective concerned terminals.

Further, an arrestor for a gas insulated switchgear according to the present invention, in which a plurality of zinc oxide non-linear resistance elements are accommodated in a closed vessel filled with $SF_6$ gas, and in which the plurality of zinc oxide non-linear resistance elements are electrically connected in series and divided into a plurality of columns arranged in parallel, is characterized in that the capacitance of insulator spacers contacting the high voltage terminal of the arrestor and of insulator spacers contacting the ground terminal of the arrestor are varied for every column constituted by a plurality of zinc oxide resistance elements, in a stepped manner depending on the number of the zinc oxide non-linear resistance elements from the respective concerned terminals.

With the provision of the above measures, the potentials of the zinc oxide non-linear resistance elements for respective columns adjacent to the insulator spacers contacting either the high voltage terminal or the ground terminal can be shifted close to the potential of either the high voltage terminal or the ground terminal, the voltage share rate of the respective zinc oxide non-linear resistance elements is made uniform.

DETAILED DESCRIPTION OF THE PREFERRED EMBODIMENTS

Now, the present invention is explained more specifically with reference to the following embodiments.

[Embodiment 1]

Figure 1:
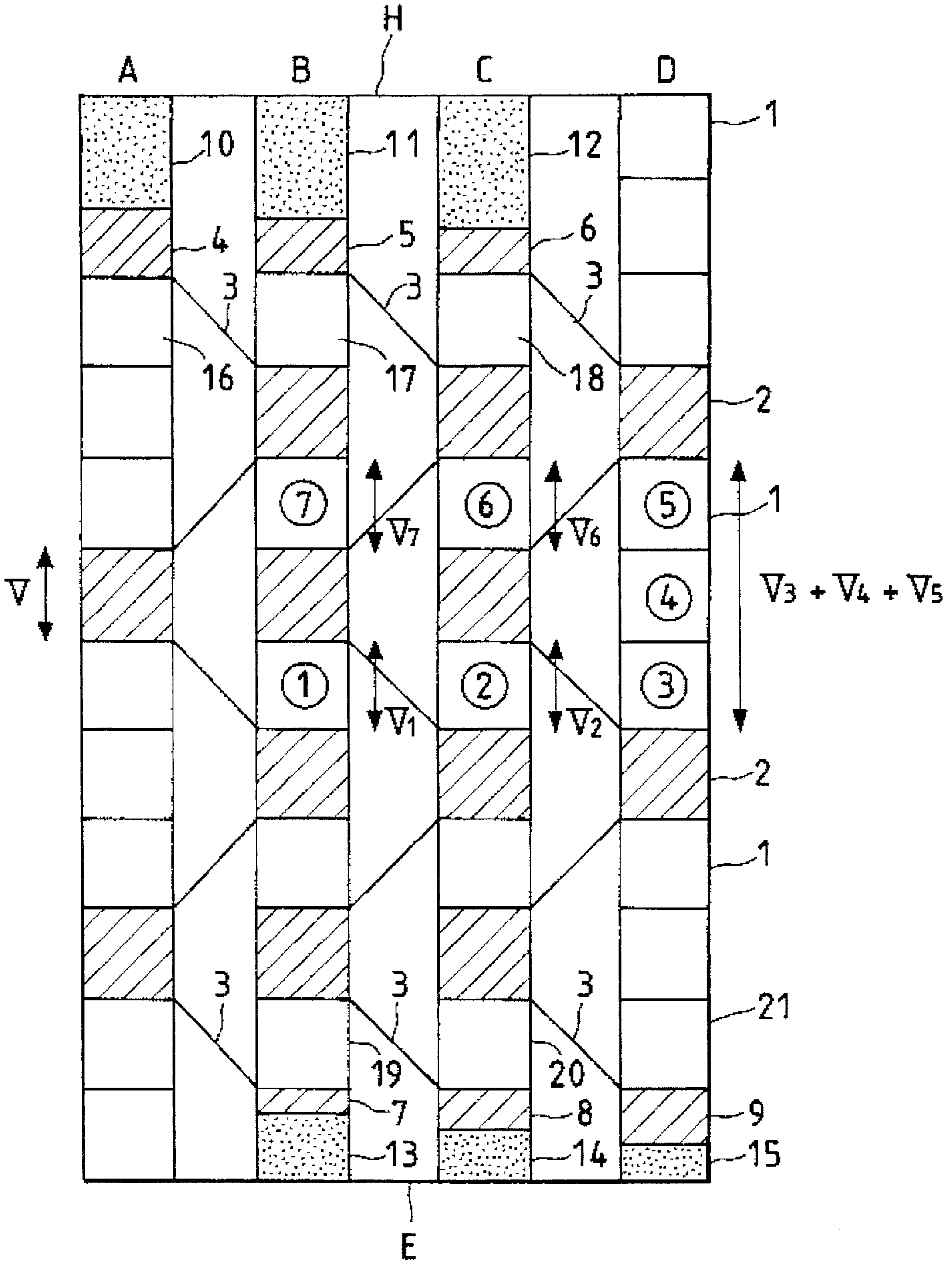
FIG. 1 is a developed diagram of one embodiment of an arrestor for a gas insulated switchgear according to the present invention.

FIG. 1 shows an embodiment of the present invention, and in which an arrestor main body is accommodated in a closed grounded vessel (not shown) filled with $SF_6$ gas.

Columns A, B, C and D of zinc oxide elements, each constituted by zinc oxide elements 1 of non-linear resistance and insulator spacers 2, are arranged in parallel, and the zinc oxide elements 1 are electrically connected in series by conductors 3 from a high voltage terminal H to a ground terminal E. The thicknesses of standard insulator spacers 2 disposed in the center portion neither contacting the high voltage terminal H nor the ground terminal E are selected substantially the same as those of the zinc oxide elements 1. On the other hand, the thicknesses of insulator spacers 4, 5 and 6 contacting the high voltage terminal H and insulator spacers 7, 8 and 9 contacting the ground terminal E are varied in a stepped manner for every column of the zinc oxide elements and depending on the number of the zinc oxide elements from the respective concerned terminals as shown in the drawing. In FIG. 1, the thicknesses of the insulator spacers 4, 5 and 6 at the side of the high voltage terminal of the columns A, B and C of zinc oxide elements are respectively determined about 5/7, 4/7 and 3/7 of the thickness of the standard insulator spacer 2 disposed in the center portion. The thicknesses of the insulator spacers 7, 8 and 9 at the side of the ground terminal E are respectively determined about 2/7, 3/7 and 4/7 of the thickness of the standard insulator spacer 2 disposed in the center portion. The dielectric constants of the insulator spacers used in the present embodiment are identical.

Figure 8:
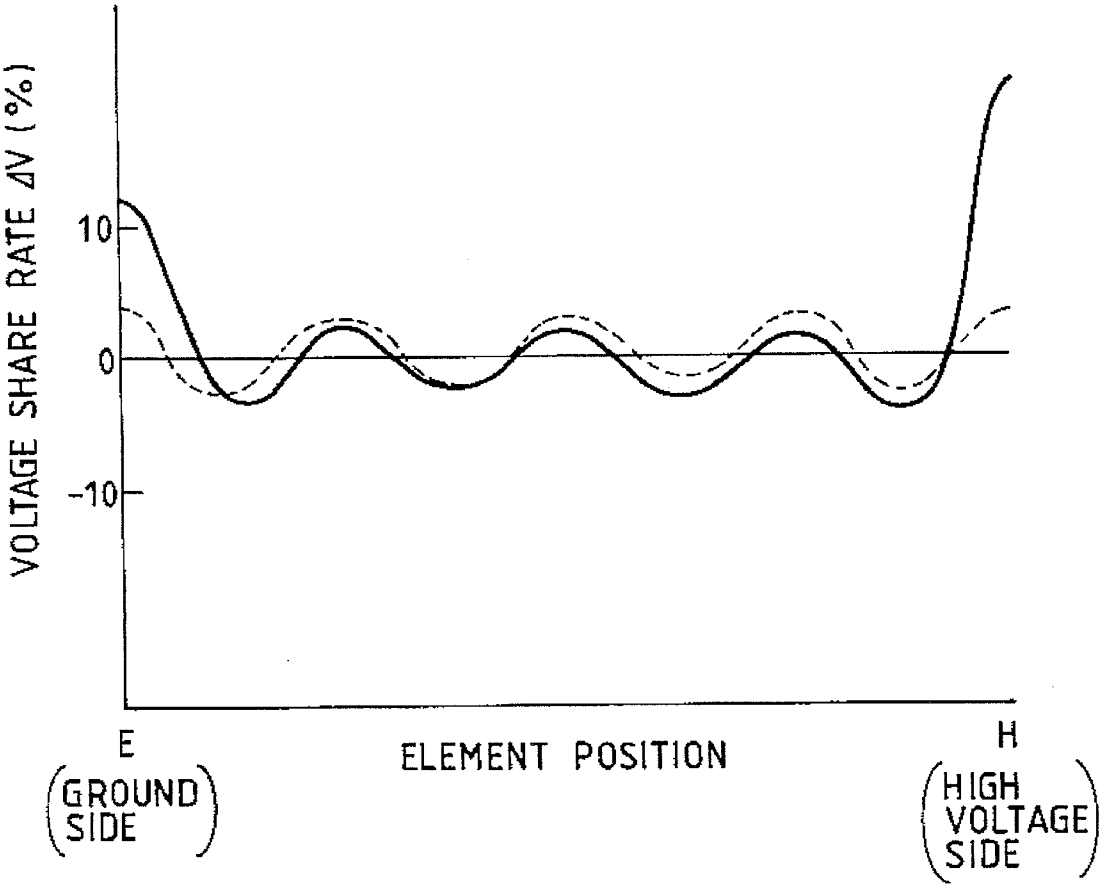
FIG. 8 is a voltage share rate characteristic of an arrestor for a gas insulated switchgear according to the present invention and that of a conventional one.

Further, between the respective insulator spacers 4, 5, 6, 7, 8 and 9 and the respective terminals, dummy conductors 10, 11, 12, 13, 14 and 15 are inserted. The potentials of zinc oxide elements 16, 17, 18, 19, 20 and 21 which contact the insulator spacers 4, 5, 6, 7, 8 and 9 are caused to shift closer to the respective terminal potentials than those in a conventional arrestor, and the applied voltage sharing of the groups of zinc oxide elements arranged as shown in FIG. 1 are placed under substantially the same condition, and the voltage share rate is improved as indicated by a dotted line in FIG. 8. Namely, with regard to the voltage share, the zinc oxide elements at the terminal sides are placed under substantially the same condition as the zinc oxide elements disposed in the center portion, and the voltage share rate by the zinc oxide elements at the terminal sides is reduced, and the entire voltage share rates are made uniform.

According to the present embodiment, an advantage is achieved in that the voltage share rates of the respective zinc oxide elements in an arrestor for a gas insulated switchgear constituted by groups of zinc oxide elements in a plurality of columns are made uniform.

The capacitances of the insulator-spacers such as 4, 5, 6, 7, 8 and 9 are determined in the following manner, in that when assuming that the number of the zinc oxide non-linear resistance elements for the ith column counting from the high voltage terminal starting from the column D is ni;

$$Ci = \frac{ni}{ni-1} Co$$

wherein,

Co: capacitance of a standard insulator spacer 2 disposed in the center portion i.e., other than the insulator spacers at the terminals)

Ci: capacitance of an insulator spacer at the terminal in the ith column.

[Embodiment 2]

Figure 2:
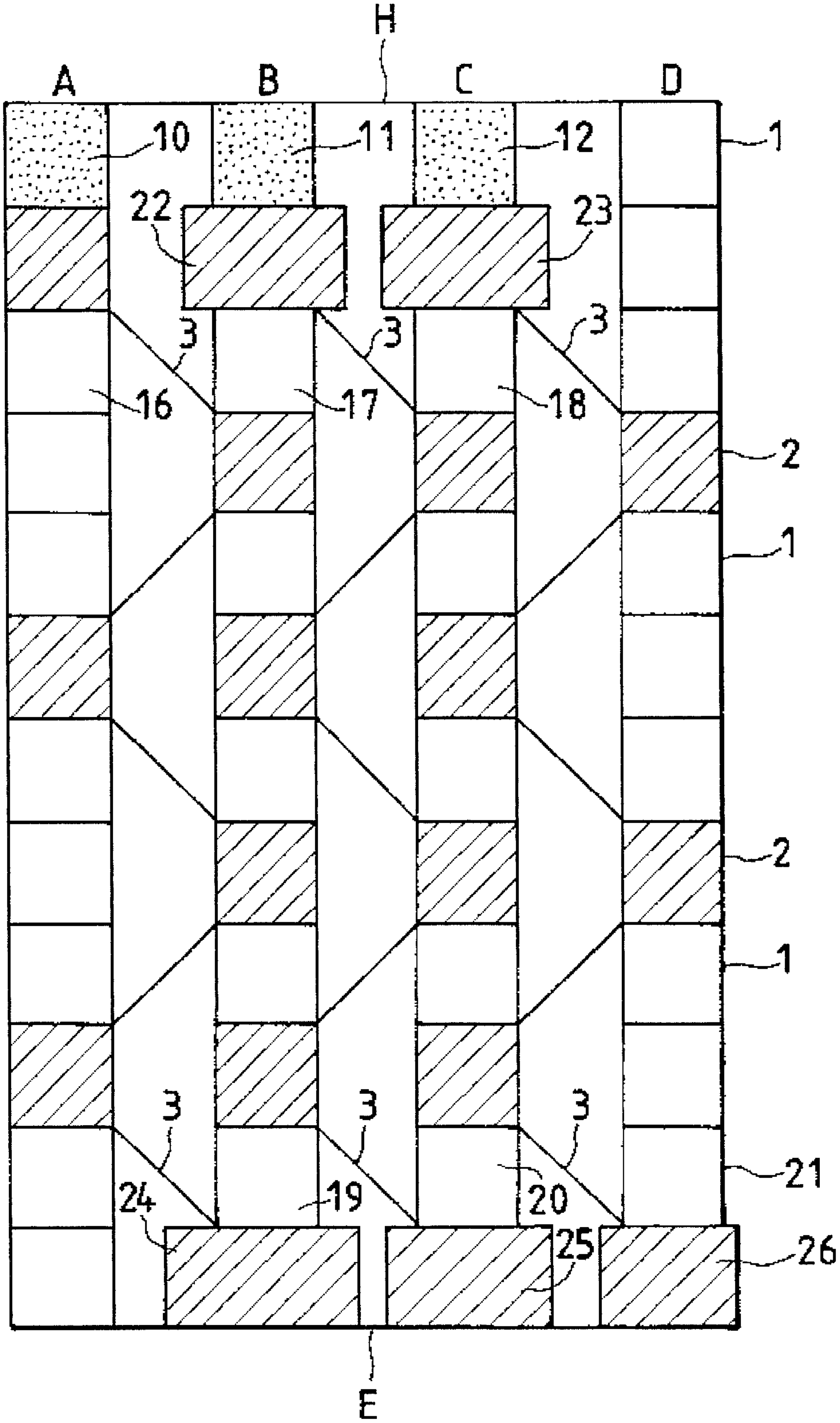
FIG. 2 is a developed diagram of another embodiment of an arrestor for a gas insulated switchgear according to the present invention.

FIG. 2 shows another embodiment in which, instead of reducing the thicknesses of the insulator spacers at the terminal portions, the diameters of insulator spacers 22, 23, 24, 25 and 26 are increased in a stepped manner while keeping the thicknesses thereof unchanged. With this measure, the equivalent capacitance of the respective insulator spacers increases in a manner like the embodiment shown in FIG. 1, whereby the voltages applied to the respective zinc oxide elements are made uniform without reducing the dielectric breakdown resistance of the insulator spacers.

[Embodiment 3]

Figure 3:
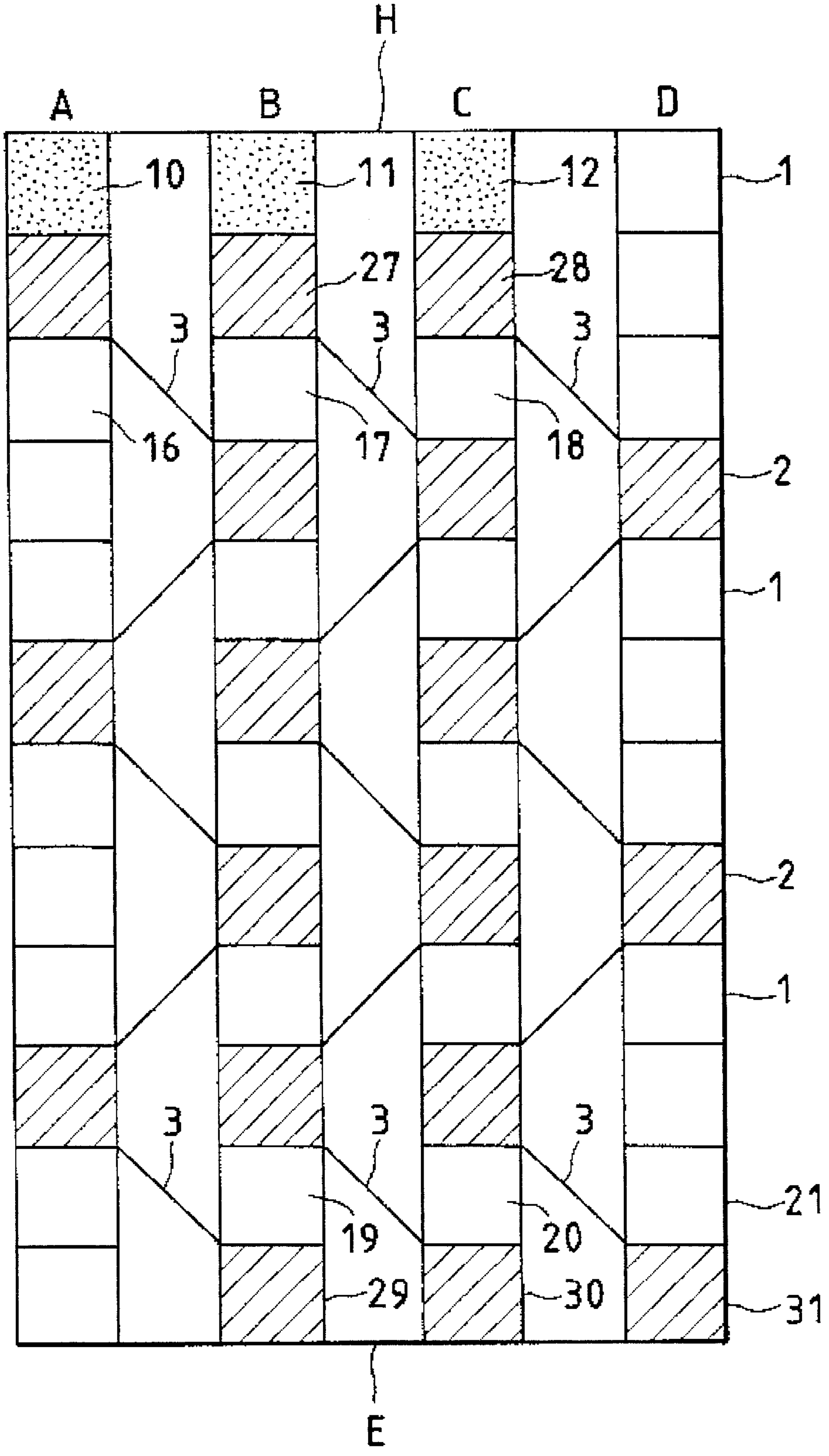
FIG. 3 is a developed diagram of still another embodiment of an arrestor for a gas insulated switchgear according to the present invention.

FIG. 3 shows still another embodiment in which, instead of reducing the thicknesses of the insulator spacers at the terminal portions, the dielectric constants of insulator spacers 27, 28, 29, 30 and 31 are increased in a stepped manner while keeping the thicknesses thereof unchanged. With this measure, the equivalent capacitance of the respective insulator spacers increases in a manner like the embodiment shown in FIG. 1, whereby the voltages applied to the respective zinc oxide elements are made uniform without reducing the dielectric breakdown resistance of the insulator spacers.

[Embodiment 4]

Figure 4:
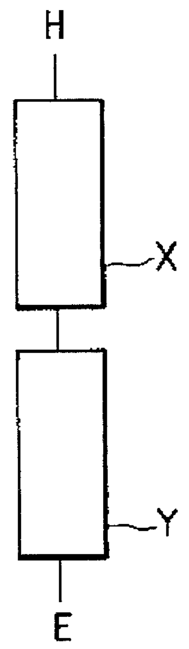
FIG. 4 is a block diagram of a further embodiment of an arrestor for a gas insulated switchgear according to the present invention.

FIG. 4 shows an arrestor for a gas insulated switchgear in which units X and Y, each constituted by dividing the electrically serially connected zinc oxide elements into a plurality of columns disposed in parallel as shown, for example, in FIG. 1, are stacked in a plurality of stages, and capacitances of the insulator spacers contacting the terminals at the high voltage side and of the insulator spacers contacting the terminals at the ground side are increased in a stepped manner for every column of the zinc oxide elements and depending on the increased number of the zinc oxide elements from the respective concerned terminals. According to the present embodiment, the voltages applied to the respective zinc oxide elements are uniform in an arrestor for a gas insulated switchgear which is constituted in multiple stages each having a plurality of columns arranged in parallel.

[Embodiment 5]

Figure 5:
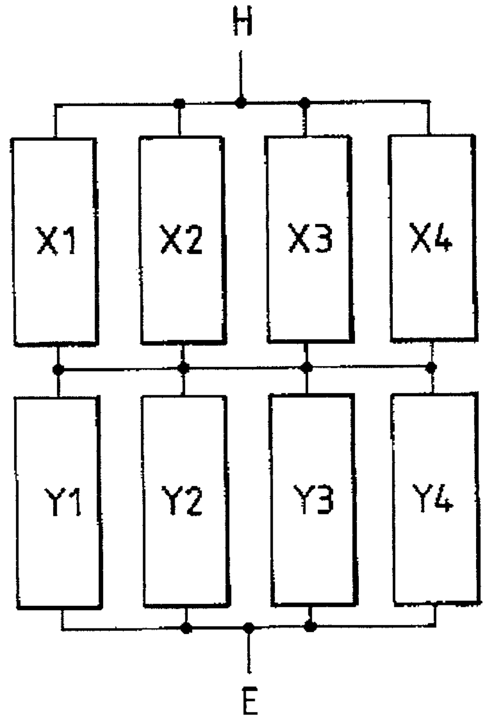
FIG. 5 is a block diagram of a still further embodiment of an arrestor for a gas insulated switchgear according to the present invention.

FIG. 5 shows an arrestor for a gas insulated switchgear in which units X1, X2, X3, X4 and Y1, Y2, Y3, Y4 disposed electrically in parallel, each constituted by dividing the electrically serially connected zinc oxide elements into a plurality of columns disposed in parallel as shown, for example, in FIG. 1, are stacked in a plurality of stages, and capacitances of the insulator spacers contacting the terminals at the high voltage side and of the insulator spacers contacting the terminals at the ground side are increased in a stepped manner for every column of the zinc oxide elements and depending on the increased number of the zinc oxide elements from the respective concerned terminals. According to the present embodiment, the voltages applied to the respective zinc oxide elements are made uniform in an arrestor for a gas insulated switchgear which is constituted in multiple stages each having a plurality of units electrically connected in parallel.

[Embodiment 6]

Figure 6:
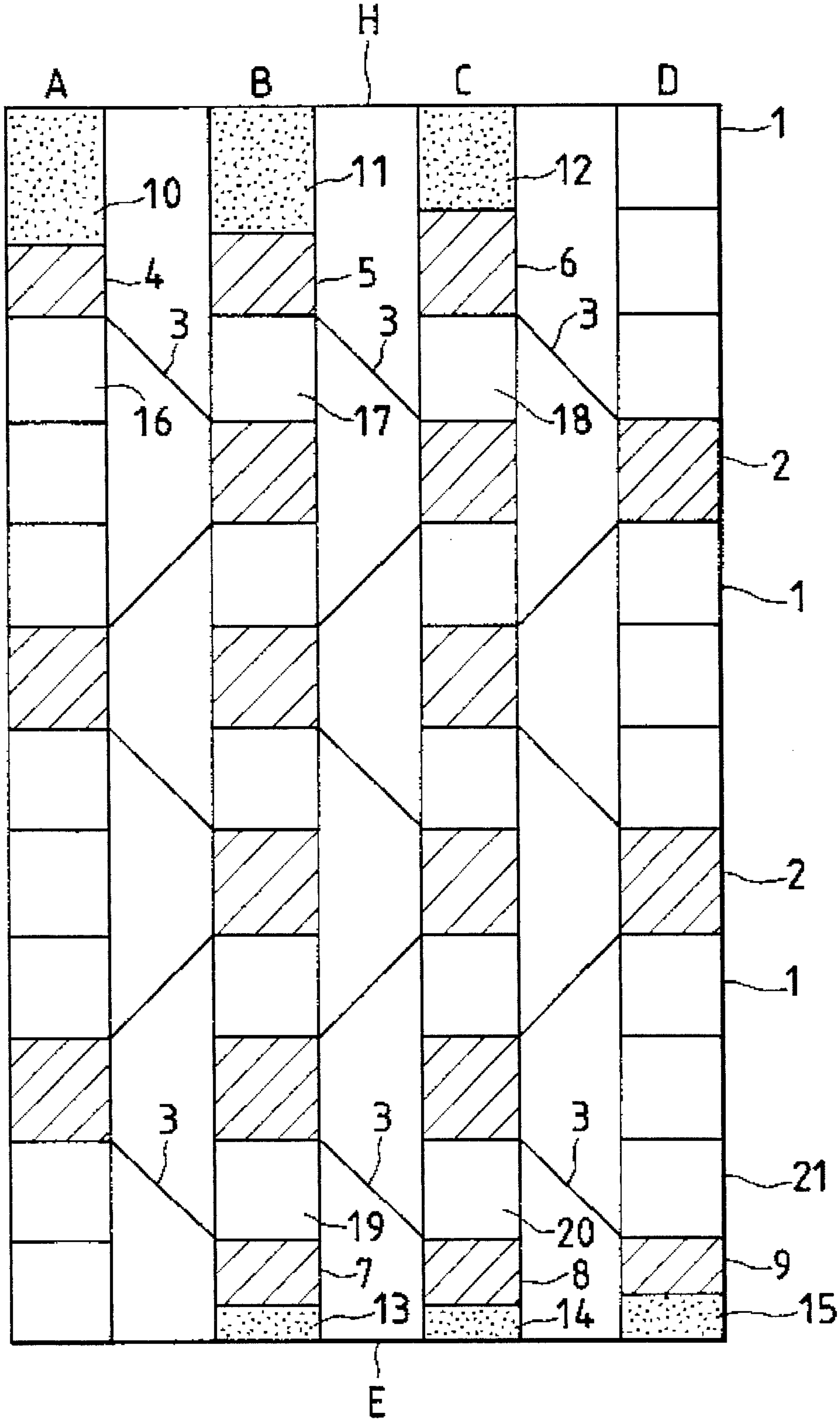
FIG. 6 is a developed diagram of a still further embodiment of an arrestor for a gas insulated switchgear according to the present invention.
Figure 7:
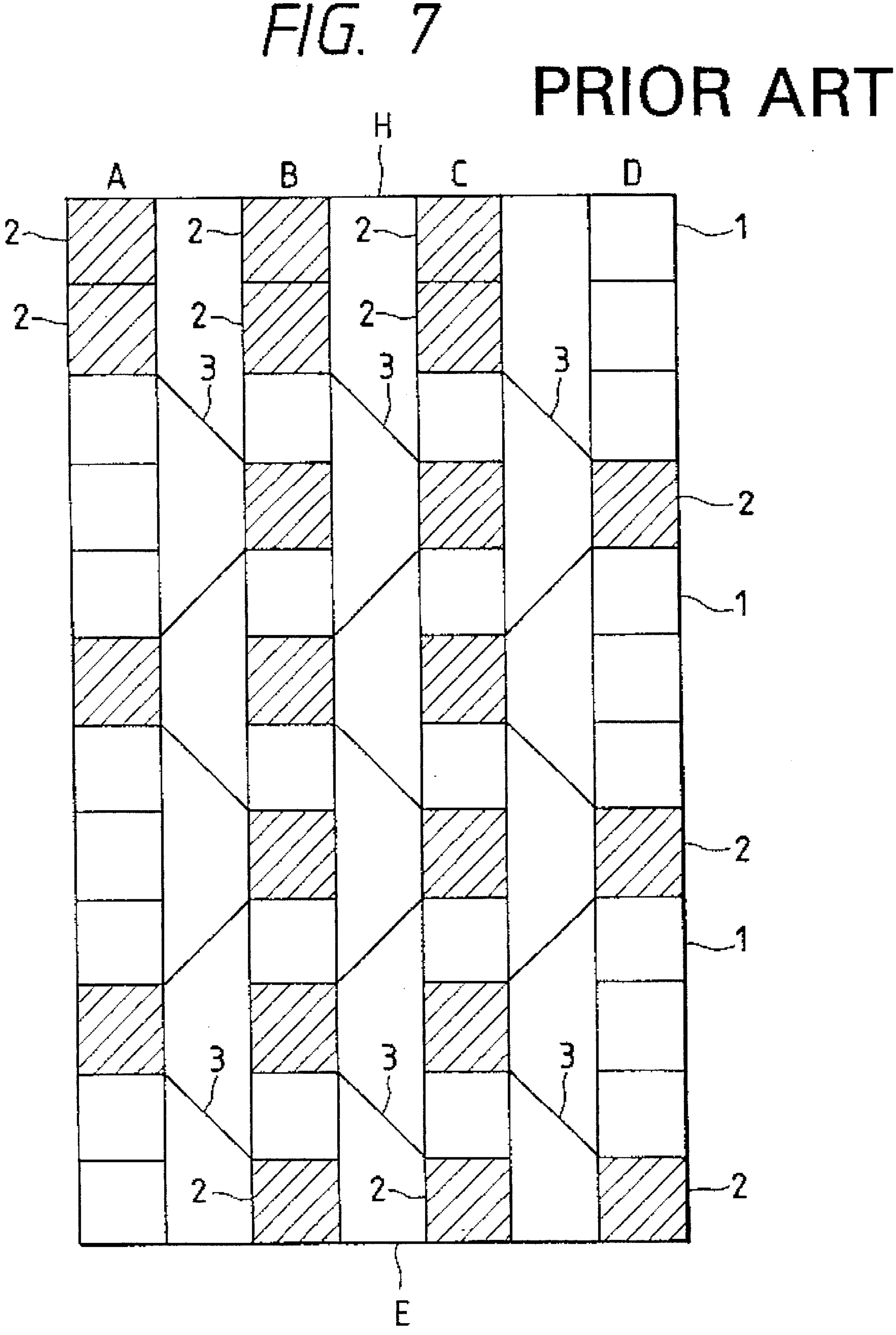
FIG. 7 PRIOR ART
FIG. 7 is a developed diagram of a conventional arrestor for a gas insulated switchgear.

FIG. 6 shows an arrestor for a gas insulated switchgear in which the electrically serially connected zinc oxide elements are divided into a plurality of columns arranged in parallel, in which the thicknesses of the insulator spacers contacting the terminal at the high voltage side and of the insulator spacers of the respective columns contacting the terminal at the ground side are made thinner than the thicknesses of the insulator spacers disposed at the center portion not contacting the respective concerned terminals. The present measure can be easily applied to an arrestor having a plurality of the units stacked in multiple stages as shown in FIG. 4 and FIG. 5.

[Embodiment 7]

In an arrestor for a gas insulated switchgear in which the electrically serially connected zinc oxide elements are divided in a plurality of columns arranged in parallel, the thicknesses of the insulator spacers in the respective columns located at the vicinity of the terminals at the high voltage side and at the ground side are made thinner than the thicknesses of the insulator spacers disposed at the center portion, and the thicknesses are reduced in a stepped manner toward the terminals.

According to the present embodiment the voltage share rate of the zinc oxide elements at the vicinity of the terminals at the high voltage side and at the ground side is made uniform with a great design freedom. The present measure can be easily applied to an arrestor having a plurality of the units stacked in multiple stages as shown in FIG. 4 and FIG. 5.

According to the present invention, in an arrestor for a gas insulated switchgear, the thickness or the capacitance of the insulator spacers contacting the high voltage terminal and the ground terminal is controlled, whereby the potentials of the zinc oxide elements close to the high voltage terminal or to the ground terminal in the respective columns can be shifted close to the potentials of the high voltage terminal or the ground, thus, an arrestor constituted by a plurality of columns for a gas insulated switchgear can be provided in which the voltage share rates of the respective zinc oxide elements are made uniform.

We claim:

1. An arrestor for a gas insulated switchgear in which a plurality of zinc oxide non-linear resistance elements are accommodated in a closed vessel filled with $SF_6$ gas and the plurality of zinc oxide non-linear resistance elements are electrically connected in series and divided into a plurality of columns arranged in parallel, characterized in that the thickness of insulator spacers contacting, directly or through a conductor, the high voltage terminal in the respective columns, and of insulator spacers contacting, directly or through a conductor, the ground terminal in the respective columns, are varied for every column constituted by a plurality of zinc oxide resistance elements in a stepped manner depending on the number of the zinc oxide non-linear resistance elements from the respective concerned terminals.

2. An arrestor for a gas insulated switchgear according to claim 1, characterized in that the thickness of the insulator spacers contacting, directly or through a conductor, either the high voltage terminal or the ground terminal, is increased in a stepped manner depending on increased number of the zinc oxide non-linear resistance elements from the respective concerned terminal.

3. An arrestor for a gas insulated switchgear in which a plurality of zinc oxide non-linear resistance elements are accommodated in a closed vessel filled with $SF_6$ gas and the plurality of zinc oxide non-linear resistance elements are electrically connected in series and divided into a plurality of columns arranged in parallel, characterized in that the capacitance of insulator spacers contacting, directly or through a conductor, the high voltage terminal in the respective columns, and of insulator spacers contacting, directly or through a conductor, the ground terminal in the respective columns, are varied for every column constituted by a plurality of zinc oxide resistance elements in a stepped manner depending on the number of the zinc oxide non-linear resistance elements from the respective concerned terminals.

4. An arrestor for a gas insulated switchgear according to claim 3, characterized in that the capacitance of the insulator spacers contacting, directly or through a conductor, either the high voltage terminal or the ground terminal, is decreased in a stepped manner depending on increased number of the zinc oxide non-linear resistance elements from the respective concerned terminal.

5. An arrestor for a gas insulated switchgear according to claim 3, characterized in that the capacitance of the insulator spacers contacting, directly or through a conductor, either the high voltage terminal or the ground terminal, is varied in a stepped manner by varying the diameter of the insulator spacers while keeping the thickness thereof unchanged.

6. An arrestor for a gas insulated switchgear according to claim 3, characterized in that the capacitance of the insulator spacers contacting, directly or through a conductor, either the high voltage terminal or the ground terminal, is varied in a stepped manner by varying the dielectric constants of the insulator spacers while keeping the configuration thereof unchanged.

7. An arrestor for a gas insulated switchgear in which a plurality of zinc oxide non-linear resistance elements are accommodated in a closed vessel filled with $SF_6$ gas and a plurality of units each constituted by dividing electrically serially connected zinc oxide non-linear resistance elements into a plurality of columns arranged in parallel are stacked in a plurality of stages, characterized in that the capacitances of insulator spacers contacting the high voltage terminal, and of insulator spacers contacting, directly or through a conductor, the ground terminal in respective stages, are decreased in a stepped manner for every column of the zinc oxide non-linear resistance elements depending on increased number of zinc oxide non-linear resistance elements from the respective concerned terminals.

8. An arrestor for a gas insulated switchgear in which a plurality of zinc oxide non-linear resistance elements are accommodated in a closed vessel filled with $SF_6$ gas and a plurality of units partly electrically connected in parallel each constituted by dividing electrically serially connected zinc oxide non-linear resistance elements into a plurality of columns arranged in parallel are stacked in a plurality of stages, characterized in that the capacitances of insulator spacers contacting, directly or through a conductor, the high voltage terminal, and of insulator spacers contacting, directly or through a conductor, the ground terminal in respective stages, are decreased in a stepped manner for every column of the zinc oxide non-linear resistance elements depending on increased number of zinc oxide non-linear resistance elements from the respective concerned terminals.

9. An arrestor for a gas insulated switchgear in which a plurality of zinc oxide non-linear resistance elements are accommodated in a closed vessel filled with $SF_6$ gas and the plurality of zinc oxide non-linear resistance elements are electrically connected in series and divided into a plurality of columns arranged in parallel, characterized in that the thickness of insulator spacers contacting, directly or through a conductor, the high voltage terminal, and of insulator spacers contacting, directly or through a conductor, the ground terminal of the respective columns, are made thinner than the thickness of an insulator spacer not so contacting the concerned terminal.

10. An arrestor for a gas insulated switchgear in which a plurality of zinc oxide non-linear resistance elements are accommodated in a closed vessel filled with $SF_6$ gas and a plurality of units partly electrically connected in parallel each constituted by dividing electrically serially connected zinc oxide non-linear resistance elements into a plurality of columns arranged in parallel are stacked in a plurality of stages, characterized in that the thickness of insulator spacers contacting, directly or through a conductor, the high voltage terminal, and of insulator spacers contacting, directly or through a conductor, the ground terminal of the respective columns in respective stages, are made thinner than the thickness of an insulator spacer not so contacting the concerned terminal.

11. An arrestor for a gas insulated switchgear in which a plurality of zinc oxide non-linear resistance elements are accommodated in a closed vessel filled with $SF_6$ gas and the plurality of zinc oxide non-linear resistance elements are connected in series and divided into a plurality of columns arranged in parallel, characterized in that the thickness of insulator spacers at the vicinity of the high voltage terminal and the ground terminal of the respective columns are made thinner than the thickness of an insulator spacer not contacting, directly or through a conductor, the concerned terminal.

12. An arrestor for a gas insulated switchgear in which a plurality of zinc oxide non-linear resistance elements are accommodated in a closed vessel filled with $SF_6$ gas and a plurality of units partly electrically connected in parallel each constituted by dividing electrically serially connected zinc oxide non-linear resistance elements into a plurality of columns arranged in parallel are stacked in a plurality of stages, characterized in that the thickness of insulator spacers at the vicinity of the high voltage terminal and the ground terminal of the respective columns in respective stages are made thinner than the thickness of an insulator spacer not contacting, directly or through a conductor, the concerned terminal.

* * * * *

UNITED STATES PATENT AND TRADEMARK OFFICE

CERTIFICATE OF CORRECTION

PATENT NO. : 5,585,996

DATED : December 17, 1996

INVENTOR(S) : J. OZAWA et al

It is certified that error appears in the above-indentified patent and that said Letters Patent is hereby corrected as shown below:

Claim 7, line 8, after "contacting" insert --, directly or through a conductor,--.

Signed and Sealed this

Eleventh Day of March, 1997

Attest:

BRUCE LEHMAN

*Attesting Officer* *Commissioner of Patents and Trademarks*